United States Patent
Gao et al.

(10) Patent No.: US 9,043,624 B2
(45) Date of Patent: May 26, 2015

(54) METHOD AND APPARATUS FOR POWER-EFFICIENCY MANAGEMENT IN A VIRTUALIZED CLUSTER SYSTEM

(75) Inventors: Zhi Guo Gao, Beijing (CN); Li Li, Beijing (CN); Rui Xiong Tian, Beijing (CN); Hai Shan Wu, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 13/130,312

(22) PCT Filed: Nov. 4, 2009

(86) PCT No.: PCT/EP2009/064610
§ 371 (c)(1),
(2), (4) Date: Aug. 8, 2011

(87) PCT Pub. No.: WO2010/057775
PCT Pub. Date: May 27, 2010

(65) Prior Publication Data
US 2011/0289330 A1    Nov. 24, 2011

(30) Foreign Application Priority Data
Nov. 20, 2008    (CN) .......................... 2008 1 0176337

(51) Int. Cl.
*G06F 1/32* (2006.01)
*G06F 9/50* (2006.01)
*G06F 9/455* (2006.01)

(52) U.S. Cl.
CPC .............. *G06F 9/455* (2013.01); *G06F 1/3203* (2013.01); *G06F 9/5083* (2013.01)

(58) Field of Classification Search
CPC .... G06F 1/32003; G06F 9/455; G06F 9/5083
See application file for complete search history.

(56) References Cited

U.S. PATENT DOCUMENTS 8,095,810 B2 *   1/2012   Matsuzawa et al. .......... 713/320
8,572,417 B2 *  10/2013   Matsuzawa et al. .......... 713/320

(Continued)

OTHER PUBLICATIONS

Nathuji et al., "VirtualPower: Coordinated Power Management in Virtualized Enterprise Systems", SOSP'07, Oct. 14-17, 2007, Stevenson, Washington, USA.
Intel White Paper, "Increaseing Data Center Density While Driving Down Power and Cooling Costs", Jun. 2006, http://www.intel.com/Assets/pdf/whitepaper/313462.pdf, Accessed Apr. 20, 2011.

(Continued)

*Primary Examiner* — M Elamin
(74) *Attorney, Agent, or Firm* — Tutunjian & Bitetto, P.C.; Jennifer R. Davis

(57) ABSTRACT

A method and apparatus for power-efficiency management in a virtualized cluster system. The virtualized cluster system includes a front-end physical host and at least one back-end physical host, and each of the at least one back-end physical host comprises at least one virtual machine and a virtual machine manager. Flow characteristics of the virtualized cluster system are detected at a regular time cycle, then a power-efficiency management policy is generated for each of the at least one back-end physical host based on the detected flow characteristics, and finally the power-efficiency management policies are performed. The method can detect the real-time flow characteristics of the virtualized cluster system and make the power-efficiency management policies thereupon to control the power consumption of the system and perform admission control on the whole flow, thereby realizing optimal power saving while meeting the quality of service requirements.

19 Claims, 3 Drawing Sheets

(56) References Cited

U.S. PATENT DOCUMENTS

| | | |
|---|---|---|
| 2005/0060590 A1 | 3/2005 | Bradley |
| 2008/0059972 A1 | 3/2008 | Ding |
| 2008/0184230 A1 | 7/2008 | Leech |
| 2009/0193272 A1* | 7/2009 | Matsuzawa et al. .......... 713/320 |
| 2009/0204826 A1* | 8/2009 | Cox et al. ...................... 713/320 |
| 2009/0271646 A1* | 10/2009 | Talwar et al. ................. 713/322 |
| 2010/0070784 A1* | 3/2010 | Gupta et al. .................. 713/310 |

OTHER PUBLICATIONS

Intel White Paper, "Virtualization: Architechtural Considerations and Other Evaluation Criteria", VMWare, 2005, http://www.vmware.com/pdf/virtualization_considerations.pdf, Accessed Apr. 20, 2011.

Hu et al., "Magnet: A Novel Scheduling Policy for Power Reduction in Cluster for Virtual Machines", Proceedings on the 2008 IEEE International Conference on Cluster Computing (Cluster 2008), IEEE Computer Society Press Los Angeles, CA, 2008.

* cited by examiner

METHOD AND APPARATUS FOR POWER-EFFICIENCY MANAGEMENT IN A VIRTUALIZED CLUSTER SYSTEM

CROSS-REFERENCE TO RELATED APPLICATION

This application claims priority under 35 U.S.C. §119 from PCT Application No. PCT/EP2009/064610, filed on Nov. 4, 2009, which claims priority from Chinese Patent Application No. 200810176337.2 filed Nov. 20, 2008, the entire contents of both are incorporated herein by reference.

TECHNICAL FIELD OF THE INVENTION

The present invention relates to power consumption management in virtualized environment, particularly to a method and apparatus for power-efficiency management in a virtualized cluster system.

BACKGROUND OF THE INVENTION

Data center has been widely used as a service platform to provide application service and management service. Currently, how to effectively reduce power consumption in a data center to provide a data center with high power-efficiency has become the focus in discussion.

Most existing data centers have employed host (server) virtualization technology to improve the power-efficiency of the host. Specifically, a plurality of virtual machines are created and managed on one physical host, and these virtual machines can share physical resources and run in parallel on the same physical host. These virtual machines are managed by a virtual machine manager which is located in virtualization layer and partitions the virtual machines and manages the share of CPU, memory and I/O devices. Each virtual machine runs respective workload based on request. The virtual machine manager can regulate resource provision to each virtual machine based on requirements of applications. Therefore, with the virtualization technology, power consumption can be reduced and power-efficiency of the data center can be regulated.

In general, methods for power-efficiency management in a virtualized architecture may comprise: host power on/off, dynamic voltage scaling (DVS) of CPU, virtual machine migration, and dynamic voltage and frequency scaling (DVFS), etc.

However, the current virtualization based power-efficiency management method could not increase power-efficiency or reduce power consumption to the maximum extent while meeting quality of service (QoS) requirements. There exist some applications with workload fluctuating dramatically and frequently. With only virtual machine migration based power-efficiency management method, dramatic workload fluctuations cause frequent migration of virtual machine. Thus, firstly, the power-efficiency management method cannot respond to fluctuations of workload quickly, since the migration of the virtual machine will take some time, but the fluctuation of workload is much faster than the migration of the virtual machine; secondly, the migration of the virtual machine is also an energy consumption operation, the frequent migration of the virtual machine will also increase power consumption.

On the other hand, since different virtual machines serve different workloads, their demands on hardware resources are different. In this case, when the demands of virtual machines on the same hardware resource are different, conflict in resource allocation will arise. This conflict could be solved by the virtual machine manager, but, since the virtual machine manager could not sense flow characteristics such as resource demand, variation trend etc that will affect the resource allocation, the virtual machine manager can not provide optimal decision on resource allocation, and also do not know the impact of these decisions on performance change of the virtual machine, so the optimal power-efficiency management could not be achieved.

SUMMARY OF THE INVENTION

A technical solution which reduces power consumption while meeting the quality of service is necessary to provide a high power-efficient data center The invention is proposed in view of the above problems, and provides a method and apparatus for power-efficiency management in a virtualized cluster system, which enables the virtualized cluster system to save power to the maximum extent while meeting the quality of service requirements.

According to one aspect of the invention, there is provided a method for power-efficiency management in a virtualized cluster system, wherein the virtualized cluster system comprises a front-end physical host and at least one back-end physical host, and each of the at least one back-end physical host contains at least one virtual machine and a virtual machine manager for managing the at least one virtual machine, the method comprising: detecting flow characteristics of the virtualized cluster system at a regular time cycle; generating a power-efficiency management policy for each of the at least one back-end physical host based on the detected flow characteristics; and performing the power-efficiency management policies.

According to another aspect of the invention, there is provided an apparatus for power-efficiency management in a virtualized cluster system, wherein the virtualized cluster system comprises a front-end physical host and at least one back-end physical host, and each of the at least one back-end physical host contains at least one virtual machine and a virtual machine manager for managing the at least one virtual machine, the apparatus comprising: a detection module that detects flow characteristics of the virtualized cluster system at a regular time cycle; a control module that generates a power-efficiency management policy for each of the at least one back-end physical host based on the detected flow characteristics; and an performing module that performs the power-efficiency management policies.

BRIEF DESCRIPTION OF THE DRAWINGS

It is believed that the above and other features and advantages of the invention will be more apparent from the description of the embodiments of the invention in conjunction with the accompanying drawings.

DETAILED DESCRIPTION OF THE PREFERRED EMBODIMENTS

Figure 1:
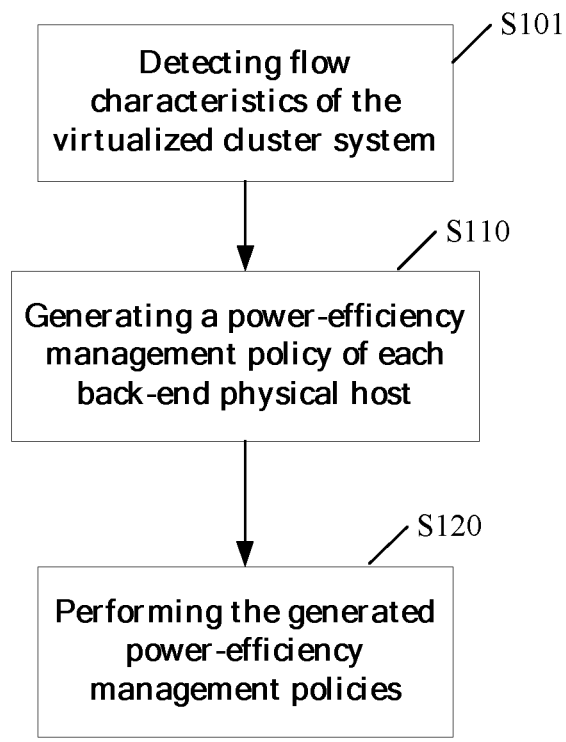
FIG. 1 is a flowchart of a method for power-efficiency management in a virtualized cluster system according to an embodiment of the invention.

FIG. 1 is a flowchart of a method for power-efficiency management in a virtualized cluster system according to an embodiment of the invention. Next, the embodiment will be described in detail in conjunction with the figure.

In this and subsequent embodiments, so-called 'virtualized cluster system' means a system that serves application and comprises one or more physical hosts with virtualization. Specifically, the virtualized cluster system comprises a front-end physical host and at least one back-end physical host, and each of the at least one back-end physical host contains at least one virtual machine and a virtual machine manager to manage the at least one virtual machine.

In this embodiment, the front-end physical host is a proxy server that is responsible for message management, the back-end physical host is a server with virtualization, and the virtual machine manager uses Hypervisor software.

Generally, there are operating system and middleware in the virtual machine, and applications run on the middleware. Deployment and configuration of the applications, real-time fluctuation of workload, provision of resources (such as CPU, memory, I/O, etc), real-time performance and QoS requirements can be known through the middleware.

As shown in FIG. 1, at step S101, flow characteristics of messages of the virtualized cluster system are detected at a regular time cycle. As mentioned above, the flow characteristics of the system should be considered in order to provide the optimal power-efficiency management. In this embodiment, the time cycle can be set, for example, to be 5 seconds. Of course, a person skilled in the art can set the time cycle as required.

Figure 2:
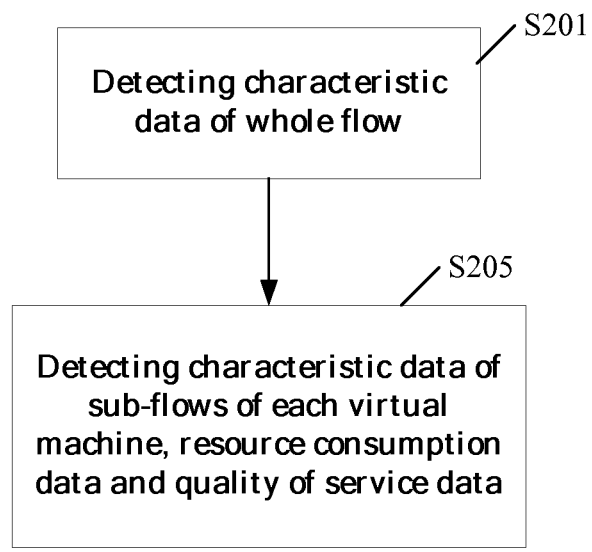
FIG. 2 is a flowchart of the step of detecting flow characteristics in the embodiment of FIG. 1.

FIG. 2 shows a flowchart of the step S101 of detecting flow characteristics. As shown in FIG. 2, at step S201, characteristic data of whole flow entering the virtualized cluster system is detected on the front-end physical host. The characteristic data at least comprises arrival rate of the whole flow and wait time of messages before dispatched from the front-end physical host to the back-end physical hosts. At step S205, characteristic data of sub-flows entering each virtual machine, resource consumption data and quality of service data are detected on the virtual machine. In this embodiment, the characteristic data of the sub-flows of each virtual machine at least comprises dispatch rate of messages dispatched from the front-end physical host to the virtual machine, the resource consumption data at least comprises CPU utilization of the virtual machine, and the quality of service data at least comprises service time of processing a message by the virtual machine.

In this embodiment, step S201 and step S205 are performed in parallel. In addition, a person skilled in the art can understand that the above flow characteristics of the system can also comprise other desired measure criteria such as throughput, according to different applications.

Figure 3:
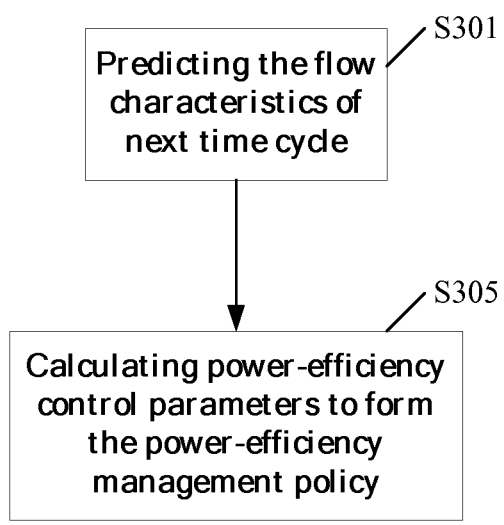
FIG. 3 is a flowchart of the step of generating a power-efficiency management policy in the embodiment of FIG. 1.

Next, at step S110, a power-efficiency management policy for each back-end physical host is generated based on the flow characteristics of the virtualized cluster system detected at step S101. FIG. 3 shows a flowchart of the step S110 of generating a power-efficiency management policy.

As shown in FIG. 3, at step S301, the flow characteristics of next time cycle is predicted based on the detected flow characteristics, which comprises the characteristic data of the whole flow, the characteristic data of the sub-flows of each virtual machine, the resource consumption data and the quality of service data. This step can be implemented by training a flow model with the detected flow characteristics.

The flow model can be, for example, a machine repairman model for simulating HTTP service flow and SIP service flow, or a traditional queuing model such as M/M/n model, according to the application serviced by the virtualized cluster system.

Then, at step S305, power-efficiency control parameters for power-efficiency management are calculated for each back-end physical host based on the flow characteristics of the next time cycle predicted at step S301, to form the power-efficiency management policy of the back-end physical host. In this embodiment, the power-efficiency control parameters at least comprise: admission rate of the whole flow; queue length limit of each message queue; weight of each message queue; frequency value that should be set for each CPU; and on/off instruction for each CPU. Since different applications have different QoS requirements, the messages flowing into the virtualized cluster system are classified at front-end physical host and the messages of different classes are placed into the different message queues. Within these parameters, the admission rate of the whole flow, the queue length limit of each message queue and the weight of each message queue are used to control the performance to meet the QoS requirements, while the frequency value that should be set for each CPU and the on/off instruction for each CPU are used to control power consumption to achieve optimal power-efficiency. The above power-efficiency control parameters constitute the power-efficiency management policy.

In this step S110, the current and historical flow characteristics are used to predict the future flow characteristics and calculate the power-efficiency control parameters. In this way, the power-efficiency management policy can respond to variation of the flow characteristics to achieve the power saving to the maximum extent.

Next an example will be given to describe how to calculate the power-efficiency control parameters to form the power-efficiency management policy.

Assume that the virtualized cluster system comprises two back-end physical hosts and each back-end physical host has one CPU thereon, the adjustable frequencies of each CPUs are 600 MHz and 1000 MHz. It can be known from the detection on the front-end physical host and back-end physical host that: if the CPU frequency is set to be 600 MHz and the CPU utilization is 50%, the power consumption of the virtualized cluster system is 200 W; and if the CPU frequency is set to be 1000 MHz and the CPU utilization is 30%, the power consumption of the virtualized cluster system is 250 W; the CPU cycle number required by each request is 1000; and the current flow rate (arrival rate of the whole flow) is 300 requests per second and is constant.

Then, based on the current flow rate, it can be calculated that the cycle number of the CPU required to serve all the requests at this time is 1000×300=300 M cycles/second. Since the minimum frequency of each CPU is 600 MHz, i.e., there are 600 M CPU cycles per second, the current flow requirement can be met with one CPU. In this case, the formed power-efficiency management policy is as follows:

1. The admission rate of the whole flow of the system is 300 requests/second.

2. Use CPU on one back-end physical host, that is, enable one CPU and stop the other CPU.

3. The frequency of the enabled CPU is determined as 600 MHz, and the determination method is as follows: if the frequency of the CPU is 600 MHz, when the admission rate of the flow is 300 requests/second, the CPU utilization will be (1000×300)/600000=50%, and the power consumption is 200 W; if the frequency of the CPU is 1000 MHz, when the admission rate of the flow is 300 requests/second, the CPU utilization will be (1000×300)/1000000=30%, and the power consumption is 250 W. Therefore, when the CPU frequency is set to 600 MHz, the system can save more power and can meet the flow requirement of 300 requests/second.

4. The queue length of the message queue in the front-end physical host is kept as the default length, since the resources of the CPU are sufficient and there is no special requirement on the queue length.

5. The weight of the message queue corresponding to the back-end physical host with the enabled CPU is set to 1, and the weight of the message queue corresponding to the back-end physical host with the stopped CPU is set to 0, which indicates that all the request messages will be dispatched to the back-end physical host with the enabled CPU.

Then, at step S120, the power-efficiency management policies generated at step S110 are performed. In this embodiment, the whole flow entering into the virtualized cluster system is controlled in the front-end physical host based on the admission rate of the whole flow, the queue length limit of each message queue and the weight of each message queue. The resource provision to each virtual machine is controlled by the virtual machine manager of each back-end physical host based on the frequency value that should be set for each CPU and the on/off instruction for each CPU.

It can be seen from the above description that the method for power-efficiency management in a virtualized cluster system of this embodiment can detect the real-time flow characteristics of the virtualized cluster system and generate the power-efficiency management policies to control the power consumption and perform admission control on the whole flow. Thus the optimal power saving can be achieved while meeting the quality of service requirements, so that the virtualized cluster system with high power-efficiency can be provided.

Figure 4:
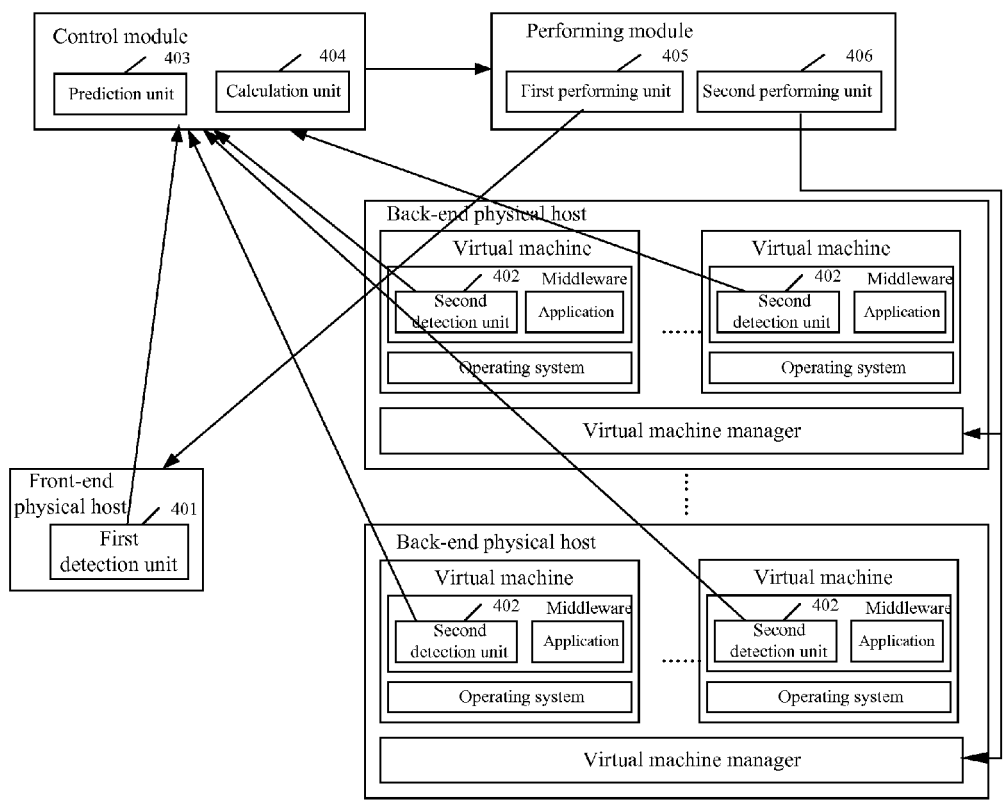
FIG. 4 is a schematic block diagram of a virtualized cluster system that employs an apparatus for power-efficiency management in a virtualized cluster system according to an embodiment of the invention.

Under the same inventive concept, FIG. 4 is a schematic block diagram of a virtualized cluster system that employs an apparatus for power-efficiency management in a virtualized cluster system according to an embodiment of the invention. Next, the embodiment will be described in detail in conjunction with the figure, and for the same parts as those of the previous embodiment, their descriptions will be properly omitted.

In this embodiment, as mentioned above, the virtualized cluster system comprises a front-end physical host and at least one back-end physical host, and each back-end physical host contains at least one virtual machine and a virtual machine manager for managing these virtual machines.

As shown in FIG. 4, the apparatus for power-efficiency management in a virtualized cluster system of this embodiment comprises: a detection module which detects flow characteristics of the virtualized cluster system at a regular time cycle; a control module which generates a power-efficiency management policy for each back-end physical host based on the detected flow characteristics; and a performing module which performs the generated power-efficiency management policies.

In the apparatus, firstly, the detection module detects the flow characteristics of the virtualized cluster system at a regular time cycle such as 5 seconds. Specifically, the detection module includes a first detection unit 401 located on the front-end physical host and a second detection unit 402 located on each virtual machine.

The first detection unit 401 detects the characteristic data of the whole flow entering into the virtualized cluster system, which at least comprises arrival rate of the whole flow and wait time of messages before dispatched from the front-end physical host to the back-end physical hosts.

The second detection unit 402 detects characteristic data of the sub-flows entering into the virtual machine, resource consumption data and quality of service data, wherein the characteristic data of the sub-flows at least comprises dispatch rate of messages dispatched from the front-end physical host to the virtual machine, the resource consumption data at least comprises CPU utilization of the virtual machine, and the quality of service data at least comprises service time of processing a message by the virtual machine.

Then, the flow characteristics detected by the detection module are delivered to the control module for generating the power-efficiency management policy of each back-end physical host.

Specifically, within the control module, a prediction unit 403 predicts the flow characteristics of next time cycle based on the received flow characteristics. In this embodiment, the prediction unit 403 performs the prediction by training a flow model with the received flow characteristics. As mentioned above, the flow model can be a machine repairman model or a traditional queuing model.

Then, the flow characteristics of next time cycle predicted by the prediction unit 403 are delivered to a calculation unit 404. The calculation unit 404 calculates power-efficiency control parameters for power-efficiency management for each back-end physical host to form the power-efficiency management policy of the back-end physical host. In this embodiment, the power-efficiency control parameters at least comprise: admission rate of the whole flow entering into the virtualized cluster system, queue length limit of each message queue, weight of each message queue, frequency value that should be set for each CPU, and on/off instruction for each CPU.

In this embodiment, the control module can be an individual component or integrated into the front-end physical host or one of the back-end physical hosts. Alternatively, the control module can be implemented as software, which runs on a stand-alone physical host as an individual software process, or on the front-end physical host or one of the back-end physical hosts.

Then, the power-efficiency management policies generated in the control module are sent to the performing module. In the performing module, a first performing unit 405 controls the whole flow entering the virtualized cluster system in the front-end physical host, based on the admission rate of the whole flow, the queue length limit of each message queue and the weight of each message queue in the power-efficiency management policies. A second performing unit 406 controls the resource provision to each virtual machine in the virtual machine manager of each back-end physical host, based on the frequency value that should be set for each CPU and the on/off instruction for each CPU in the power-efficiency management policies.

In this embodiment, the first performing unit 405 and the second performing unit 406 are independent components. However, a person skilled in the art can understand that, the first and second performing unit 405, 406 can be combined into one performing unit, or the first performing unit 405 can be integrated into the front-end physical host and the second performing unit 406 can be integrated into the virtual machine manager.

It can be seen from the above description that the apparatus for power-efficiency management in a virtualized cluster system of this embodiment can operationally realize the method for power-efficiency management in a virtualized cluster system shown in FIG. 1-3.

It should be pointed out that the apparatus for power-efficiency management in a virtualized cluster system of this embodiment and its components can be implemented by hardware circuit such as Very Large Scale Integrated Circuit or gate array, semiconductor such as logic chips or transistors, or programmable hardware devices such as field programmable gate array, programmable logic device, or by software executed on various types of processors, or by the combination of the above hardware circuit and software.

Although a method and apparatus for power-efficiency management in a virtualized cluster system have been described in detail in conjunction with the preferred embodiments, the present invention is not limited as above. It should be understood for the persons skilled in the art that the above embodiments may be varied, replaced or modified without departing from the spirit and the scope of the present invention.

The invention claimed is:

1. A method for power-efficiency management in a virtualized cluster system, wherein the virtualized cluster system comprises a front-end physical host and at least one back-end physical host, and each of said at least one back-end physical host comprises at least one virtual machine and a virtual machine manager for managing said at least one virtual machine, the method comprising:
   detecting flow characteristics of said virtualized cluster system at a regular time cycle, wherein the detecting flow characteristics comprises:
      detecting, on said front-end physical host, characteristic data of whole flow entering said virtualized cluster system; and
      detecting, on each of said at least one virtual machine, characteristic data of sub-flows entering the virtual machine, resource consumption data and quality of service data;
   generating a power-efficiency management policy, utilizing a processor within a back-end physical host, for each of said at least one backend physical host based on the detected flow characteristics; and
   performing said power-efficiency management policies.

2. The method according to claim 1, wherein the characteristic data of whole flow at least comprises: arrival rate of the whole flow and wait time of messages before dispatched from said front-end physical host to said at least one back-end physical host.

3. The method according to claim 1, wherein, the characteristic data of sub-flows of each of said virtual machines at least comprises: dispatch rate of messages dispatched from said front-end physical host to the virtual machine.

4. The method according to claim 1, wherein the resource consumption data of each of said virtual machines at least comprises: CPU utilization of the virtual machine.

5. The method according to claim 1, wherein the quality of service data of each of said virtual machines at least comprises: service time of processing a message by the virtual machine.

6. The method according to claim 1, wherein the step of generating a power-efficiency management policy comprises:
   predicting the flow characteristics of next time cycle based on the detected flow characteristics; and
   calculating power-efficiency control parameters for power-efficiency management for each of said back-end physical host based on the predicted flow characteristics of next time cycle to form the power-efficiency management policy of the back-end physical host.

7. The method according to claim 6, wherein the step of predicting future flow characteristics is implemented by training a flow model.

8. The method according to claim 6, wherein the power-efficiency control parameters at least comprises: admission rate of the whole flow; queue length limit of each message queue; weight of each message queue; frequency value that should be set for each CPU; and on/off instruction for each CPU.

9. The method according to claim 8, wherein the step of performing said power efficiency management policies comprises:
   controlling said whole flow in said front-end physical host, based on the admission rate of the whole flow, the queue length limit of each message queue and the weight of each message queue in said power-efficiency management policies; and
   controlling resource provision to each of said virtual machines in said virtual machine manager within each of said at least one back-end physical host, based on the frequency value that should be set for each CPU and the on/off instruction for each CPU in said power-efficiency management policies.

10. An apparatus, including a non-transitory computer readable storage medium, for power-efficiency management for use with a virtualized cluster system, wherein the virtualized cluster system comprises a front-end physical host and at least one back-end physical host, and each of said at least one back-end physical host comprises at least one virtual machine and a virtual machine manager for managing said at least one virtual machine, the apparatus comprising:
   a detection module that detects flow characteristics of said virtualized cluster system at a regular time cycle, wherein the detection module comprises:
      a first detection unit that is located on said front-end physical host and detects characteristic data of whole flow entering said virtualized cluster system; and
      a second detection unit that is located on each of said at least one virtual machine and detects characteristic data of sub-flows entering the virtual machine, resource consumption data and quality of service data;
   a control module that generates a power-efficiency management policy, utilizing a processor within a back-end physical host, for each of said at least one back-end physical host based on the detected flow characteristics; and
   a performing module that performs said power-efficiency management policies.

11. The apparatus according to claim 10, wherein the characteristic data of whole flow at least comprises: arrival rate of the whole flow and wait time of messages before dispatched from said front-end physical host to said at least one back-end physical host.

12. The apparatus according to claim 10, wherein the characteristic data of sub-flows of each of said virtual machines at least comprises: dispatch rate of messages dispatched from said front-end physical host to the virtual machine.

13. The apparatus according to claim 10, wherein the resource consumption data of each of said virtual machines at least comprises: CPU utilization of the virtual machine.

14. The apparatus according to claim 10, wherein the quality of service data of each of said virtual machines at least comprises: service time of processing a message by the virtual machine.

15. The apparatus according to claim 10, wherein the control module comprises:
   a prediction unit that predicts the flow characteristics of next time cycle based on the detected flow characteristics; and a calculation unit that calculates power-efficiency control parameters for power-efficiency management for each of said back-end physical hosts based on the predicted flow characteristics of next time cycle to form the power-efficiency management policy of the back-end physical host.

16. The apparatus according to claim 15, wherein the prediction unit performs prediction by training a flow model.

17. The apparatus according to claim 15, wherein the power-efficiency control parameters at least comprises: admission rate of the whole flow; queue length limit of each message queue; weight of each message queue; frequency value that should be set for each CPU; and on/off instruction for each CPU.

18. The apparatus according to claim 17, wherein the performing module comprises:
   a first performing unit that controls said whole flow in said front-end physical host, based on the admission rate of the whole flow, the queue length limit of each message queue and the weight of each message queue in said power-efficiency management policies; and
   a second performing unit that controls resource provision to each of said virtual machines in said virtual machine manager within each of said at least one back-end physical host, based on the frequency value that should be set for each CPU and the on/off instruction for each CPU in said power-efficiency management policies.

19. A non-transitory computer readable storage medium tangibly embodying a computer readable program code having computer readable instructions which, when implemented, cause a computer to carry out the steps of claim 1.

* * * * *